United States Patent
Wang et al.

(10) Patent No.: US 12,533,361 B2
(45) Date of Patent: Jan. 27, 2026

(54) USE OF POLAPREZINC IN PREPARING DRUG FOR TREATING CASTRATION-RESISTANT PROSTATE CANCER

(71) Applicant: Jiangnan University, Wuxi (CN)

(72) Inventors: Rong Wang, Wuxi (CN); Yongquan Chen, Wuxi (CN); Shenglong Zhu, Wuxi (CN); Xiaoying Wang, Wuxi (CN); Yuanyuan Mi, Wuxi (CN); Sheng Wu, Wuxi (CN); Jian Sun, Wuxi (CN)

(73) Assignee: Jiangnan University, Wuxi (CN)

( * ) Notice: Subject to any disclaimer, the term of this patent is extended or adjusted under 35 U.S.C. 154(b) by 911 days.

(21) Appl. No.: 17/829,633

(22) Filed: Jun. 1, 2022

(65) Prior Publication Data

US 2022/0305026 A1    Sep. 29, 2022

Related U.S. Application Data

(63) Continuation of application No. PCT/CN2021/108355, filed on Jul. 26, 2021.

(30) Foreign Application Priority Data

May 8, 2021 (CN) .......................... 202110501971.4

(51) Int. Cl.
| | | |
|---|---|---|
| *A61K 31/555* | (2006.01) | |
| *A61K 31/4166* | (2006.01) | |
| *A61K 31/502* | (2006.01) | |
| *A61K 31/58* | (2006.01) | |
| *A61P 35/00* | (2006.01) | |

(52) U.S. Cl.
CPC ........ *A61K 31/555* (2013.01); *A61K 31/4166* (2013.01); *A61K 31/502* (2013.01); *A61K 31/58* (2013.01); *A61P 35/00* (2018.01)

(58) Field of Classification Search
CPC ... A61P 35/00; A61K 31/555; A61K 31/4166; A61K 31/502; A61K 31/58
See application file for complete search history.

(56) References Cited

FOREIGN PATENT DOCUMENTS

| CN | 106562976 A | 4/2017 | |
|---|---|---|---|
| WO | 2007059329 A2 | 5/2007 | |
| WO | WO-2016073897 A1 * | 5/2016 | .............. A61P 35/00 |

OTHER PUBLICATIONS

MedlinePlus [Internet]. Bethesda (MD): National Library of Medicine (US); [updated Oct. 15, 2023]. Abiraterone; [Oct. 15, 2023]; Available from: https://medlineplus.gov/druginfo/meds/a611046.html (Year: 2023).*
MedlinePlus [Internet]. Bethesda (MD): National Library of Medicine (US); [updated Dec. 15, 2023]. Olaparib; [Dec. 15, 2023]; Available from: https://medlineplus.gov/druginfo/meds/a614060.html (Year: 2023).*
US Food & Drug Administration. "Drugs@FDA Glossary of Terms," https://www.fda.gov/drugs/drug-approvals-and-databases/drugsfda-glossary-terms, Updated Nov. 14, 2017 (Year: 2017).*
National Center for Biotechnology Information. PubChem Compound Summary for CID 9817450, CID 9817450. https://pubchem.ncbi.nlm.nih.gov/compound/9817450. Accessed Jul. 17, 2025 (Year: 2025).*
Tai, Sheng, Yin Sun, Jill M. Squires, Hong Zhang, William K. Oh, Chao-Zhao Liang, and Jiaoti Huang. "PC3 is a cell line characteristic of prostatic small cell carcinoma." The Prostate 71, No. 15 (2011): 1668-1679 (Year: 2011).*
Penson et al."Enzalutamide versus bicalutamide in castration-resistant prostate cancer: the Strive trial." Journal of Clinical Oncology 34, No. 18 (2016): 2098-2106 (Year: 2016).*
Jiang, Wenjun, Jiyuan Chen, Chunai Gong, Yuanyuan Wang, Yuan Gao, and Yongfang Yuan. "Intravenous delivery of enzalutamide based on high drug loading multifunctional graphene oxide nanoparticles for castration-resistant prostate cancer therapy." Journal of nanobiotechnology 18, No. 1 (2020): 50) (Year: 2020).*
National Cancer Institute. NCI Dictionary of Cancer Terms. "androgen receptor antagonist." https://www.cancer.gov/publications/dictionaries/cancer-terms/def/androgen-receptor-antagonist. Accessed Jul. 17, 2025. (Year: 2025).*
Wang,Bo et. al. "Zinc inhibits Invasion and induces apoptosis of RM-1 cells in vitro" J. of China Medical Univ. vol. 43, No. 7 Jul. 31, 2014.
Theng Choon Ooi et. al. "Antioxidant, Anti-inflammatory, and GenomicStability Enhancement Effects of Zinc I-carnosine:A Potential Cancer Chemopreventive Agent?" Nutrition and Cancer, vol. 2 No. 69, Jan. 17, 2017.
Zhang, Ye et. al. "Advances in drug treatment of castration-resistant prostate cancer" Chin J Diffic and Compl Cas., vol. 19, No. 1, Jan. 31, 2020.

* cited by examiner

*Primary Examiner* — James H Alstrum-Acevedo
*Assistant Examiner* — Carolyn L. Ladd
(74) *Attorney, Agent, or Firm* — IPRO, PLLC; Na Xu

(57) ABSTRACT

The present disclosure discloses use of polaprezinc (Pola) in preparing a drug for treating castration-resistant prostate cancer (CRPC) and belongs to the technical field of biological medicine. The present disclosure provides a new strategy for preparing the drug for treating the CRPC by combining the Pola with an androgen receptor antagonist for the first time and conducts a multi-angle and multi-level verification research. A drug composition combining the polaprezinc and the androgen receptor antagonist can be used for treating castration-resistant prostate cancer, remarkably improves an effect of enzalutamide in inhibiting the castration-resistant prostate cancer, realizes new use of the old drug, can greatly shorten time from drug discovery to clinical transformation, and has important clinical treatment significance.

8 Claims, 7 Drawing Sheets

USE OF POLAPREZINC IN PREPARING DRUG FOR TREATING CASTRATION-RESISTANT PROSTATE CANCER

TECHNICAL FIELD

The present disclosure belongs to the technical field of biological medicine and specifically relates to use of polaprezinc in preparing a drug for treating castration-resistant prostate cancer.

BACKGROUND

Androgen deprivation therapy (ADT) is a standard treatment for advanced prostate cancer, but patients eventually experience progression to castration-resistant prostate cancer (CRPC) after the treatment for an average of 1-3 years. In the 2014 Canadian Urological Association (CUA) Guidelines, the CRPC is defined as prostate cancer with progression after initial continuous ADT. Meanwhile, the following criteria should be met: (1) serum testosterone is maintained at a castration level (<50 ng/dL or 1.7 nmol/L); and (2) biochemical progression: a prostate-specific antigen (PSA) level is elevated more than 50% of the lowest value in three consecutive tests at intervals of one week and has an absolute elevated value of more than 2 ng/ml; or imaging progression: two or more new lesions appear on bone scan or soft tissue lesions enlarge assessed by RECIST. Currently, it is believed that only symptomatic progression is not sufficient to diagnose CRPC.

In the past, patients with CRPC did not have an effective treatment and could only receive some palliative treatments. Since docetaxel was proved to prolong the overall survival of patients with metastatic castration-resistant prostate cancer (mCRPC) in 2004, drugs such as abiraterone acetate, enzalutamide (Enza), cabazitaxel, etc. for mCRPC have emerged in recent years and improved the treatment of these patients, but are difficult to completely treat CRPC ultimately. Therefore, it is another research hotspot in finding an effective therapy by combined use of drugs in treating CRPC.

Recently, many scholars have proposed a new mechanism of drug resistance of tumor cells through persister cells, also called tumor cells with plasticity, minimal residual disease or drug-tolerant persisters (DTP), etc. The mechanism is that in a drug-resistant state, tumor cells no longer rely on a pathway targeted by the drug, but survive through other pathways, but a target gene does not undergo any mutation and drug sensitivity recovers after drug withdrawal for a period of time. Three hypotheses are currently proposed on the mechanism: (1) a small number of drug-tolerant cells are pre-existed and the cells are increased after drug treatment according to Darwinian evolution; (2) a small number of drug-refractory cells are epigenetically modified by a small fraction of cancer cells to produce the drug-tolerant cells that coexist with residual lesions; and (3) tumor cells express various resistance genes dynamically and the resistance genes are highly expressed during drug treatment, thereby further rebuilding a resistance expression system and generating the drug-tolerant cells. In recent years, cell plasticity has emerged as a mode of targeted diagnosis evasion, a common feature of resistance in various cancers. The persister cells can be effectively inhibited by blocking new drug-resistant pathways. For example, a GPX4 lipid peroxidation pathway, highly expressed in various persister cells, is an effective target. So far, we do not know whether the persister cells exist in CRPC and whether new effective targets can be found. Therefore, this study focused on LNCaP-persister cells of prostate cancer produced by EPI-001 and Enza to find an effective combined use of drugs for treating the CRPC.

EPI-001 (EPI) is an inhibitor of androgen receptor (AR) and AR-splice variants (AR-Vs) and is expected to be clinically developed to treat the CRPC. The target of the EPI against the CRPC is mainly an N-terminal domain (NTD). Enza is a first approved second-generation AR antagonist with 5-8 times higher affinity to AR than traditional antiandrogens. In 2012, Enza was approved by the US FDA accordingly for patients with CRPC. However, both the EPI and the Enza generally develop resistance to treatment of the CRPC for about 18 months. Therefore, other means are urgently needed to overcome drug resistance and delay the CRPC.

Polaprezinc (Pola) is a chelated form of zinc and L-carnosine. The Pola is a zinc-related drug first approved in Japan and has been used clinically for treating gastric ulcers. The results indicate that the Pola may be effective in treating pressure ulcers. A study in 2013 showed that a combined administration of the Pola may be effective in treating intestinal mucosal damage caused by a long-term administration of aspirin.

SUMMARY

The technical problem to be solved by the present disclosure is to overcome resistance of the above-mentioned existing drugs and to provide a drug, combined use of enzalutamide (Enza) and polaprezinc (Pola), for effectively treating castration-resistant prostate cancer (CRPC). The drug can significantly improve a curative effect on the CRPC and exert an excellent synergistic effect.

A first object of the present disclosure is to provide use of polaprezinc in preparing a drug for treating castration-resistant prostate cancer.

In one embodiment of the present disclosure, the polaprezinc is combined with an androgen receptor antagonist for preparing a drug for treating castration-resistant prostate cancer.

A second object of the present disclosure is to provide a drug composition for treating castration-resistant prostate cancer, where the drug composition includes polaprezinc and an androgen receptor antagonist.

In one embodiment of the present disclosure, the androgen receptor antagonist and the polaprezinc have a mass ratio of (1-5):1. Preferably, the Enza and the Pola may have a mass ratio of (1-2):1.

In one embodiment of the present disclosure, the androgen receptor antagonist includes any one or more of enzalutamide (Enza), EPI-001 (EPI), abiraterone, and olaparib.

In one embodiment of the present disclosure, the drug composition further includes a pharmaceutical auxiliary material.

In one embodiment of the present disclosure, the pharmaceutical auxiliary material includes a solvent, a propellant, a solubilizer, a cosolvent, an emulsifier, a colorant, a binding agent, a disintegrant, a filler, a lubricant, a wetting agent, an osmotic pressure regulator, a stabilizer, a flow aid, a corrigent, a preservative, a suspending agent, a coating material, an aromatic, an anti-binding agent, a chelating agent, a penetration enhancer, a pH regulator, a buffering agent, a plasticizer, a surfactant, a foaming agent, an antifoaming agent, a thickener, a clathrating agent, a humectant, an absorbent, a diluent, a flocculant, a deflocculant, a filter aid, and a release retardant.

In one embodiment of the present disclosure, a dosage form of the drug composition includes an injection, a lyophilized powder for injection, a controlled release injection, a liposome injection, a suspension, an implant, an embolic agent, a capsule, a tablet, a pill, and an oral liquid.

In one embodiment of the present disclosure, the drug composition further includes a drug carrier.

In one embodiment of the present disclosure, the drug carrier further includes a microcapsule, a microsphere, a nanoparticle, and a liposome.

The present disclosure further provides a method of treating castration-resistant prostate cancer, including administering an effective amount of polaprezinc to a patient with castration-resistant prostate cancer in need.

The method of treating castration-resistant prostate cancer further includes administering a combined androgen receptor antagonist to a patient with castration-resistant prostate cancer in need.

In one embodiment of the present disclosure, after extensive research and exploration, a drug, combined use of Enza and Pola, for treating CRPC is found. Research results show that by establishing EPI and Enza-resistant prostate cancer LNCaP-drug-tolerant persisters (L-DTP) cell lines, LNCaP cells produce recoverable resistance to EPI and Enza; and the combined use of the ENZA and the Pola can significantly inhibit cell growth, an effect of the combined use of drugs is verified by a CCK8 cell proliferation assay and a synergistic effect of the combined use of drugs is determined by a CI value. Meanwhile, a mouse model of prostate cancer with overexpression of C-MYC is established. Treatment effects on CRPC of single use and combined use of the Enza and the Pola in an animal body are compared. An inhibition effect of the single use of the Enza on the CRPC is greatly improved through a synergistic effect generated by the combined use of the drugs, and the synergistic effect of the two drugs is verified in vivo and in vitro.

In one embodiment of the present disclosure, an L-DTP recoverable drug-resistant cell strain is established, a CCK8 method is used and a CI value is calculated by Calcusyn software. The results show that in the cell strain, an in-vitro combined use of the Enza and the Pola has a synergistic effect on resisting CRPC compared with the single use of the Enza or the Pola. The mouse model of prostate cancer with overexpression of C-MYC is established. Under a model that resistance is generated by long-term administration of Enza, it is determined that an Enza and Pola combined group in an animal body has a more obvious effect of resisting CRPC in vivo compared with a single drug group.

The present disclosure has the following beneficial effects:

The present disclosure firstly provides a new strategy for preparing a drug for treating CRPC using Pola and based on combined use of Enza and the Pola, clarifies an action mechanism, promotes use of the Enza and the Pola in clinical treatment of prostatic cancer and has an important significance. Drug research requires 8-10 years on average from a compound molecule to an actual clinical application, needs a large amount of manpower and material resources, and thus has a huge time cost and economic cost. The solution of the present disclosure can realize new use of the old drug and can greatly shorten time from drug discovery to clinical transformation.

DETAILED DESCRIPTION

The present disclosure is further described with reference to the drawings and specific examples, which are not intended to limit the present disclosure in any form. Unless otherwise specified, the reagents, methods and equipment used in the present disclosure are conventional in the art.

Unless otherwise specified, the reagents and materials used in the examples are commercially available.

Example 1 Production of DTP in Prostate Cancer LNCaP Cells by EPI and Enza

Prostate cancer L-DTP cell lines L-DTP-EPI and L-DTP-Enza resistant to EPI and Enza are recoverable.

1. Experimental Method $1 \times 10^6$ of LNCaP cells were seeded in a 10-cm cell culture dish. The cells were separately treated with EPI and Enza for 9 days after adhering to walls on the second day. During the period, the cells were cultured with a fresh medicated medium which was replaced every three days. After 9 days, the drug was withdrawn. The cells were cultured with a fresh medium normally in an incubator and passaged on the 6th day, 12th day and 17th day respectively. A cell morphology of DTP (the 9th day), R5 (5th day after drug withdrawal), R10 and R20 were photographed under an inverted microscope. After the DTP and cloned DTP cells were produced, the cells were digested and counted to calculate a percentage of the DTP cells to total L-parent cells. The L-parent cells and the passage 3 cells (R20) after drug withdrawal were respectively spread in 96-well plates. After the cells adhered to wall overnight, a series of EPI and Enza from high to low concentrations were prepared and added into wells with three duplicate wells of each concentration. A control group was set. The cells were incubated for 48 h in a cell incubator. CCK8 was added. The OD value of the cells at a wavelength of 450 nm was detected by a full-wavelength multi-functional microplate reader after 4 h. A survival rate was counted and a survival curve was drawn.

Figure 1A:
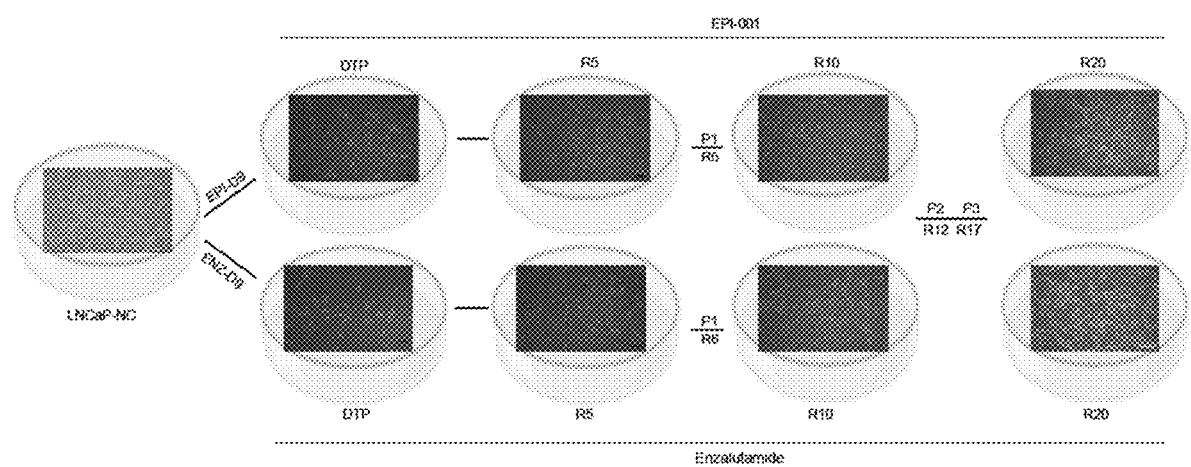
FIG. 1A is a process diagram showing drug-tolerant persisters (DTP) and cell recovery after drug withdrawal in example 1.
Figure 1B:
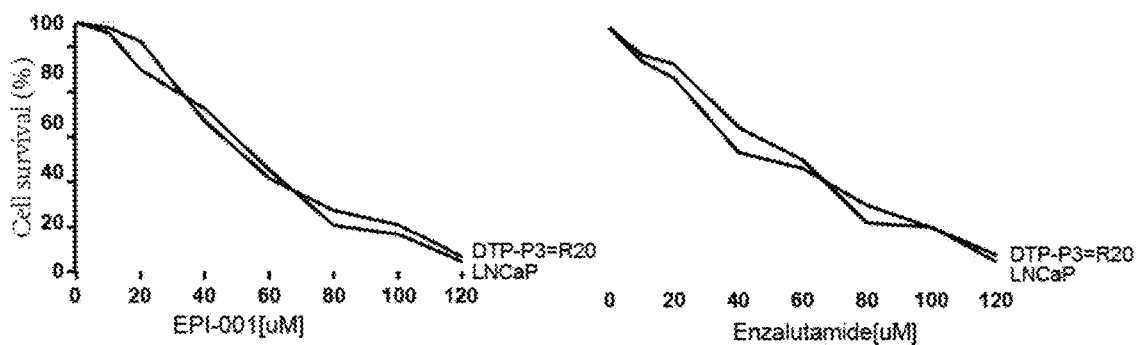
FIG. 1B shows restoration of sensitivity to a corresponding drug of passage 3 DTP-EPI cells after drug withdrawal and passage 3 DTP-Enza cells after drug withdrawal in example 1.

2. The results are shown in FIGS. 1A-B and Table 1: FIG. 1A is a process diagram showing DTP and cell recovery after drug withdrawal; and FIG. 1B shows restoration of sensitivity to corresponding drugs of passage 3 DTP-EPI cells after drug withdrawal and passage 3 DTP-Enza cells after drug withdrawal.

TABLE 1

Cell count after production of DTP in LNCaP cells

| Cell line | DTP (%) | S.D. (N = 3) |
| --- | --- | --- |
| LNCCaP-1 | 0.82 | 0.08 |
| LNCaP-1 cl.A | 0.18 | 0.12 |
| LNCaP-1 cl.B | 0.22 | 0.06 |
| LNCaP-1 cl.C | 0.54 | 0.03 |
| LNCCaP-a | 0.33 | 0.94 |
| LNCaP-a cl.A | 0.15 | 0.11 |
| LNCaP-a cl.B | 0.24 | 0.21 |
| LNCaP-a cl.C | 0.13 | 0.18 |

The results show that the number of LNCaP-DTP cells produced by EPI and Enza is very small. The drug-resistant cells are all resistant to the EPI and the Enza, but passage 3 cells after drug withdrawal can recover their morphologies and sensitivity to drugs.

Example 2 Characteristic Establishment of Changes of Expression Amounts of AR-Related Genes in DTP and Cells after Drug Withdrawal The passage 3 DTP cells after drug withdrawal recover morphologies and changes of expression amounts of AR-related genes in cells can also be recovered.

1. Experimental Method

LNCaP cells were seeded in a 10-cm dish. After adhering to walls overnight, the cells were treated with EPI and Enza separately for 9 days. The treated cells were harvested. During the period, the cells were cultured with a fresh medicated medium which was replaced every 3 days. The remaining DTP cells were also collected 20 days after drug withdrawal. LNCaP cells treated with DMSO for 9 days were set as a normal control (NC) group. Drug-resistant cells producing L-DTP-EPI and L-DTP-Enza treated with EPI and Enza for 9 days were set as a treatment group. The cells in the treatment group 20 days after drug withdrawal were set as a recovery group. The cells in the three groups were subjected to cell lysis, protein extraction and quantification, SDS-PAGE electrophoresis gel, membrane transfer, blocking, incubation with a primary antibody, incubation with a secondary antibody, and development. Changes of expression amounts of AR-FL and its related target proteins, and AR-Vs and its related target proteins were observed. Meanwhile, the cells in the three groups were measured by qRT-PCR. Changes of expression amounts of the AR-FL and its related target genes, and AR-Vs and its related target genes were detected.

Figure 2A:
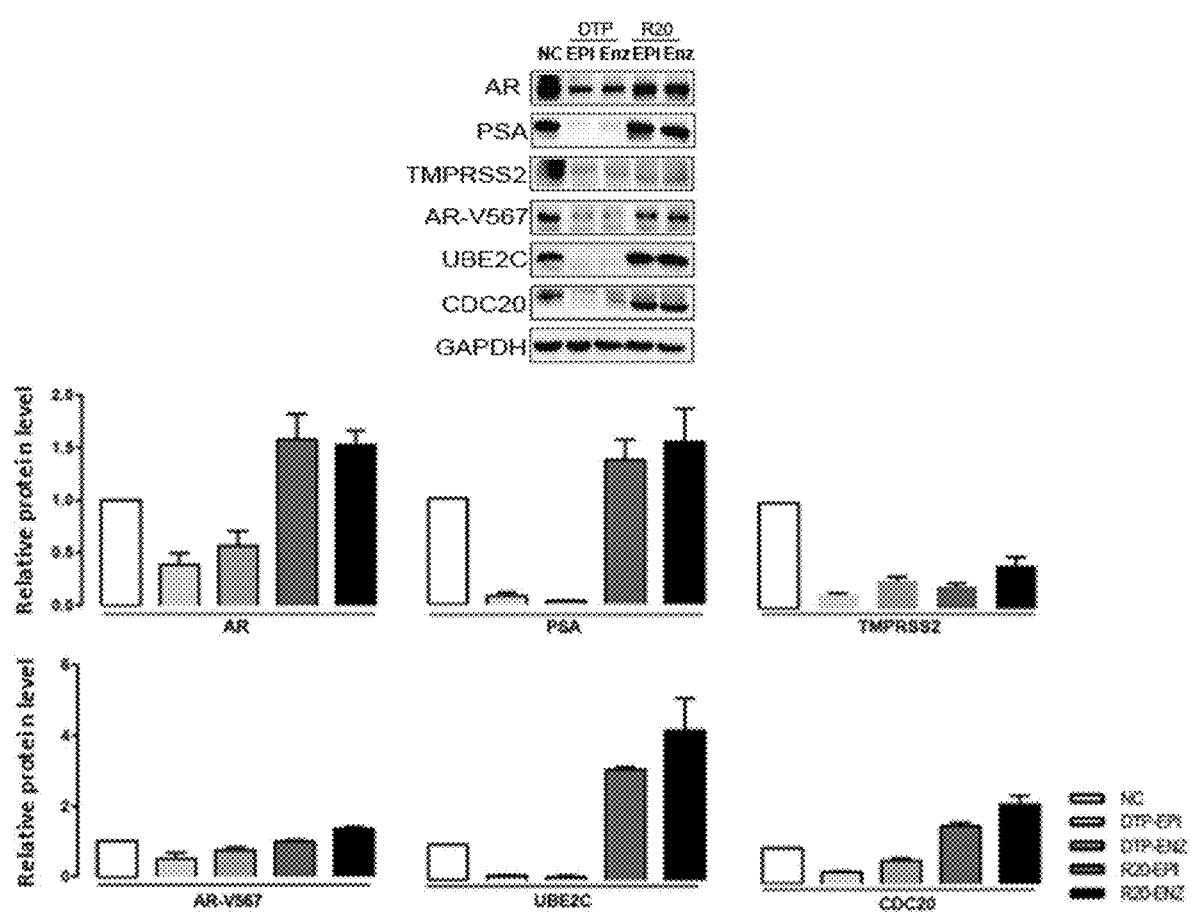
FIG. 2A shows changes in expression amounts of proteins detected by Western blot (WB) in example 2.
Figure 2B:
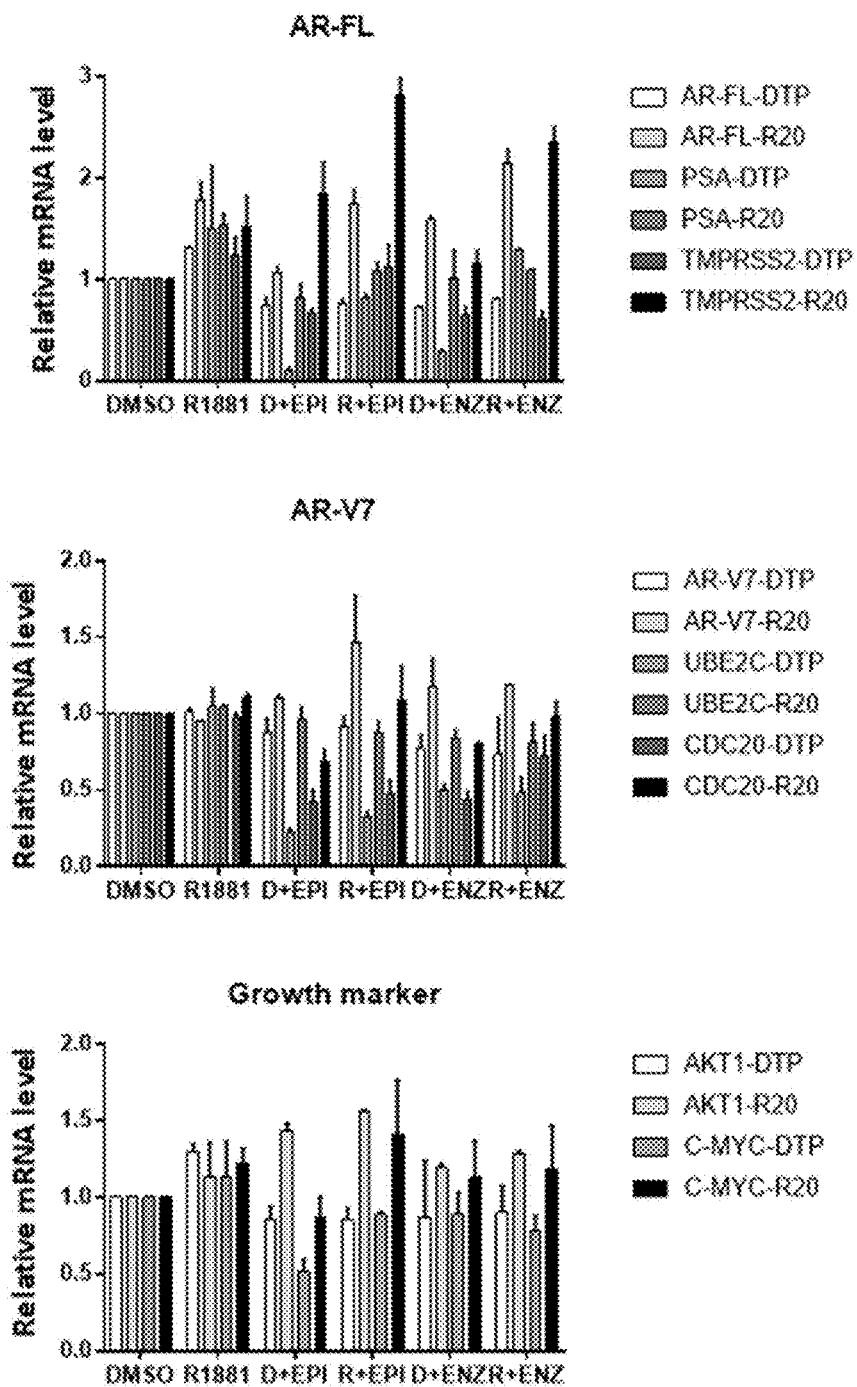
FIG. 2B shows changes in expression amounts of transcripts detected by qRT-PCR in example 2.

2. The characteristic results of changes of expression amounts of AR-related genes in DTP and cells after drug withdrawal are shown in FIG. 2A and FIG. 2B. FIG. 2 shows changes in expression amounts of proteins detected by Western blot (WB); and FIG. 2B shows changes in expression amounts of transcripts detected by qRT-PCR.

The results show that the expression amounts of the AR and its related target proteins PSA and TMPRSS2, and the AR-Vs and its related target proteins UBE2C and CDC20 are all down-regulated to varying degrees in a DTP stage, but recover after drug withdrawal (R20). Meanwhile, the expression amounts of the AR and its related target genes, the AR-Vs and its related target genes, and growth markers AKT1 and C-MYC are also down-regulated in the DTP stage, but recover to varying degrees after R20.

Example 3 Effects of EPI and Enza Separately Combined with Pola

Furthermore, CCK8 is used and drugs are used in drug-resistant L-DTP cells in a single form and combined form separately. In-vitro anti-tumor effects of Pola in drug-resistant L-DTP (EPI) and L-DTP (Enza) cells are illustrated.

1. Experimental Method

The drug-resistant L-DTP cells (including L-DTP (EPI) and L-DTP (Enza)) were seeded in 96-well plates. After the cells adhered to walls, a series of Pola from high to low concentrations were prepared. A most optimal concentration of the Pola was found. Then, under the optimal concentration, survival rates of single-use drug treated cells (L-DTP (EPI)-Pola) and combined-use drug treated cells [L-DTP (EPI)-combination (EPI+Pola)], [L-DTP (Enza)-combination (Enza+Pola)] in the drug-resistant L-DTP cells were separately determined. Cl values of the L-DTP cells were calculated by Calcusyn software.

Figure 3A:
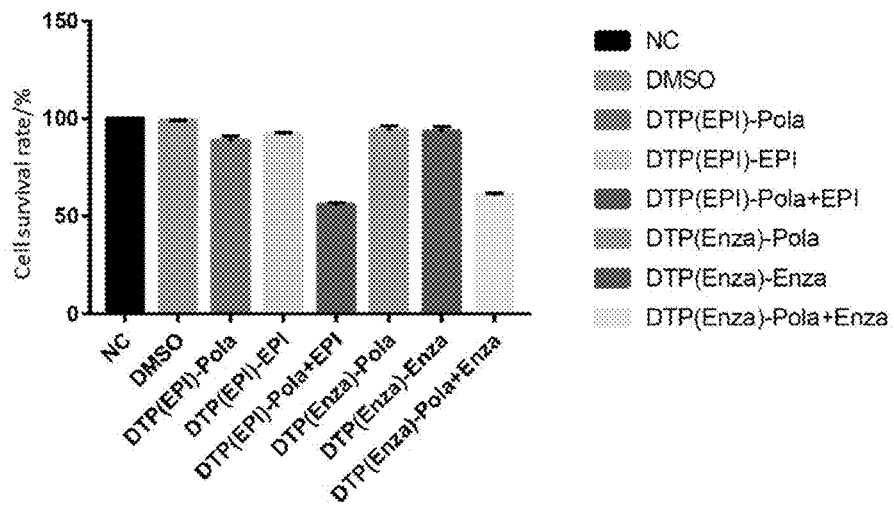
FIG. 3A is a bar graph showing relative survival rates of L-DTP-EPI and L-DTP-Enza cells treated by combined use of drugs in example 3.
Figure 3B:
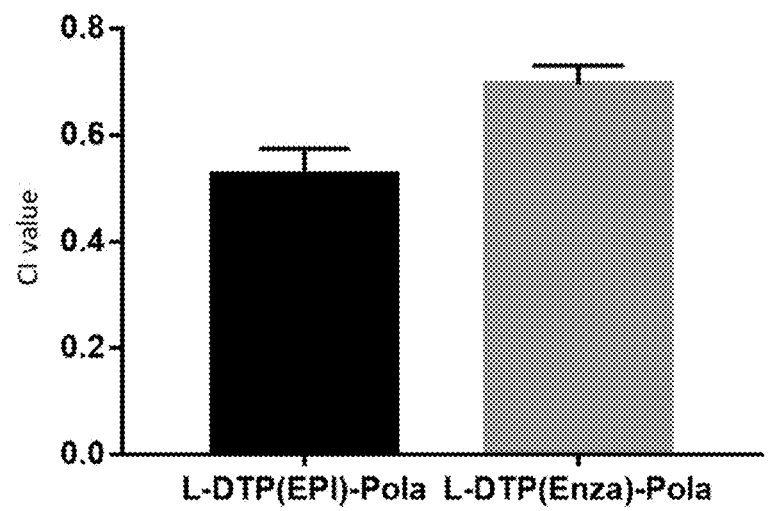
FIG. 3B is a bar graph of CI values of L-DTP-EPI and L-DTP-Enza cells treated by EPI and Enza separately combined with Pola in example 3.

2. Results of in-vitro effects of EPI and Enza separately combined with Pola in L-DTP cells are shown in FIG. 3A and FIG. 3B. FIG. 3A is a bar graph showing relative survival rates of drug-resistant L-DTP (EPI) and L-DTP (Enza) cells treated by combined use of drugs; and FIG. 3B is a bar graph of Cl values of drug-resistant L-DTP (EPI) and L-DTP (Enza) cells treated by EPI and Enza separately combined with Pola.

The results show that in the drug-resistant L-DTP (EPI) cells produced by continuously adding EPI for 9 days, a continuous addition of the EPI has no obvious inhibitory effect, and the cells also have no obvious inhibition rate after a single addition of Pola. But when EPI and Pola are used in combination, an inhibition rate can reach 55.74%. Similarly, in the drug-resistant L-DTP (Enza) cells produced by continuously adding Enza for 9 days, a continuous addition of the Enza has no obvious inhibitory effect, and the cells also have no obvious inhibition rate after a single addition of Pola. But when Enza and Pola are used in combination, an inhibition rate can reach 60.765%. The Cl values are calculated. It is found that Pola can achieve a high synergy of 0.525 in L-DTP-EPI cells and a high synergy of 0.695 in L-DTP (Enza) cells.

Example 4 Effects of Combined Use of Enza and Pola on Mouse Model of Prostate Cancer with Overexpression of C-MYC after Resistance Generated by Continuous Administration of Enza Effects of combined use of Enza and Pola in mice with a relapse after chemical castration (i.e., continuous administration of Enza) in a mouse model of prostate cancer are further illustrated.

1. Experimental Method

A mouse model of spontaneous prostate cancer with overexpression of C-MYC (Hi-Myc) was established. After 4 months, the mice developed mPIN/cancer transition and were randomly divided into a normal control (NC) group (gavaged with a solvent) and an Enza group. The mice in the Enza group were gavaged with 10 mg/Kg of Enza once every three days for a total of 30 days. A part of the mice were sacrificed and their prostate cancers were photographed and weighed. It was found that the Enza can significantly relieve the disease. The prostate weight of the Enza group was reduced by half compared with the NC group. The remaining mice were continuously administered according to the above method for 30 days. It was found that the mice in the Enza group had a relapse. After 30 days of continuous administration of Enza, the mice had an average prostate weight of 41.2 mg in the Enza group, but had an average prostate weight of 85.3 mg in the NC group. After 60 days of the continuous administration, it was found that the mice had an average prostate weight changed into 78.4 mg in the Enza group, but had an average prostate weight of 95.6 mg in the NC group. The results indicated that a relapse of CRPC caused by drug resistance occurred. At this time, the mice were divided into different groups immediately to study effects of combined use of drugs.

After the relapse of the CRPC caused by drug resistance occurred (the mice were 6 month old), the mice were randomly divided into a normal control group (always gavaged with a solvent), an Enza single group, a Pola single group, and an Enza and Pola combined group. The mice were correspondingly gavaged. The mice were gavaged with 10 mg/Kg of Enza each time in the Enza single group, 20 mg/Kg of Pola each time in the Pola single group, and 10 mg/Kg of Enza and 20 mg/Kg of Pola each time in the Enza and Pola combined group once every three days for a total of 30 days. The mice were sacrificed and their prostate cancers were photographed, weighed and subjected to immunohistochemistry.

Figure 4A:
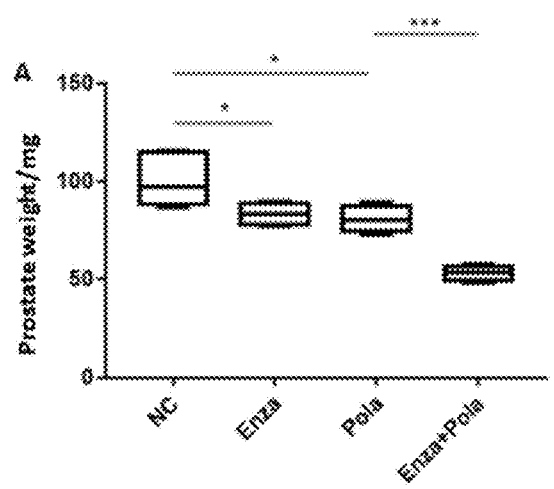
FIG. 4A shows a change of prostate weight of mice in each group with administration in example 4.
Figure 4B:
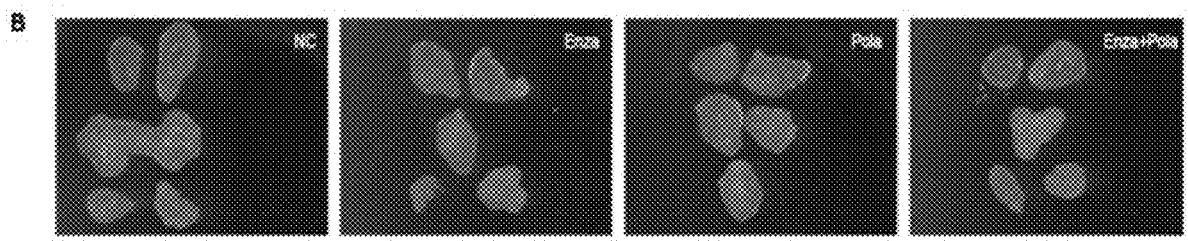
FIG. 4B shows photographs comparing prostate of mice in each group.
Figure 4C:
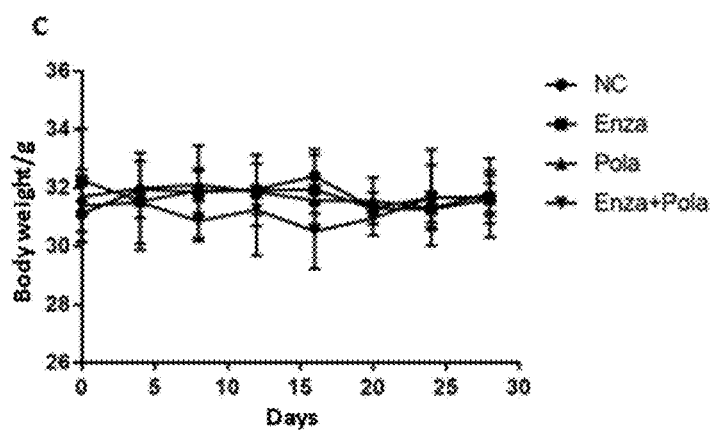
FIG. 4C shows a change of body weight of mice in each group with administration in example 4.
Figure 5A:
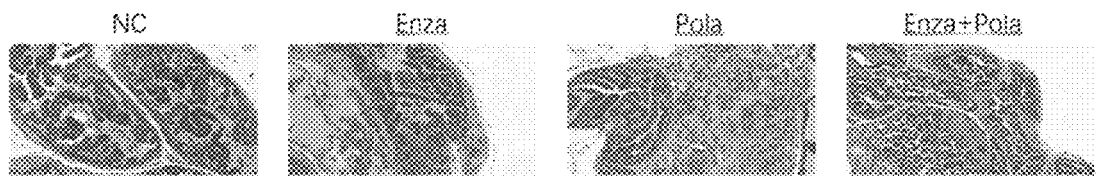
FIG. 5A shows HE staining of prostate tissue sections from mice in each group in example 4.
Figure 5B:
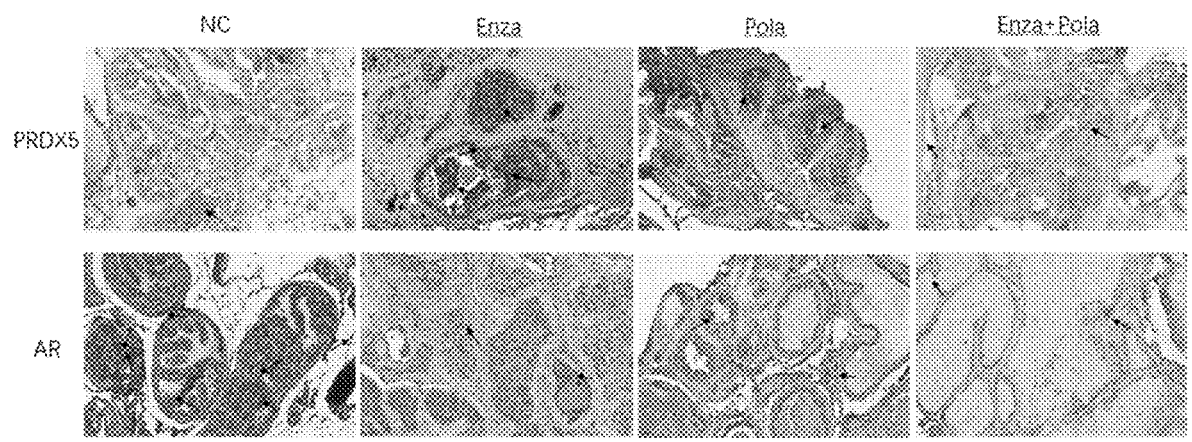
FIG. 5B shows immunohistochemical images of PRDX5 and AR in prostate tissue sections of mice in each group and a bar graph of the number of positive cells in example 4.
Figure 5B:
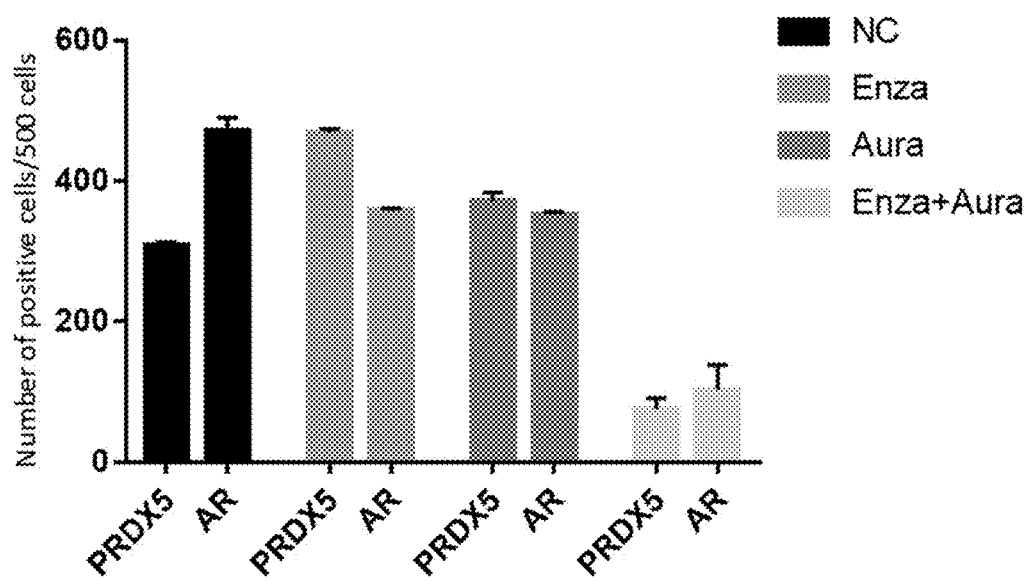

2. Results of effects of Enza, Pola and combined use thereof on a mouse model of prostate cancer with overexpression of C-MYC after resistance generated by continuous administration of Enza are shown in FIGS. 4A-4C and FIG. 5A-5B. FIG. 4A shows a change of prostate weight of mice in each group with administration; FIG. 4B shows photographs comparing prostate of mice in each group; and FIG. 4C shows a change of body weight of mice in each group with administration. FIG. 5A shows HE staining of prostate tissue sections from mice in each group; and FIG. 5B shows immunohistochemical images of AR and PRDX5 in prostate tissue sections of mice in each group and a bar graph of the number of positive cells.

Results of single and combined groups are shown in Tables 2.

TABLE 2

Effect of different administrations (for 30 days) after relapse caused by drug resistance

| Administration | Average prostate weight of mice |
| --- | --- |
| NC group | 100.1 mg |
| Enza single group after relapse caused by drug resistance | 83.3 mg |
| Pola single group after relapse caused by drug resistance | 80.625 mg |
| Enza and Pola combined group after relapse caused by drug resistance | 53.14 mg |

As shown in Table 2, combined use of the Enza and the Pola has a very significant effect compared with single use of Enza or Pola. The prostate weight can be reduced to about 53.14 mg in the Enza and Pola combined group. Meanwhile, there is almost no difference in the effect between the Enza single group and the Pola single group, indicating that single use of the Pola does not have a significant effect on drug-resistant CRPC.

The results of HE staining of tissue sections (FIGS. 5A-5B) show that the CRPC has obvious regression and fibrosis after combined use of the drugs. It can be seen from immunohistochemistry that the combined use of Enza and Pola significantly decreases expression amounts of AR and PRDX5 compared with the singe use of Enza or Pola. It is proved that the effect of the combined use is significant.

Results of single and combined groups are shown in Tables 3.

TABLE 3

Effect of different administrations (for 30 days) after relapse caused by drug resistance

| Administration | Expression amount of AR/% | Expression amount of PRDX5/% |
| --- | --- | --- |
| NC group | 94 | 61.7 |
| Enza single group after relapse caused by drug resistance | 71.5 | 93.6 |
| Pola single group after relapse caused by drug resistance | 70.4 | 74.2 |
| Enza and Pola combined group after relapse caused by drug resistance | 20.5 | 15 |

Example 5 Effects of Combined Use of Enza and Pola on Mouse Model of Prostate Cancer with Overexpression of C-MYC after Resistance Generated by Continuous Administration of Enza Effects of combined use of Enza and Pola in mice with a relapse after chemical castration (i.e., continuous administration of Enza) in a mouse model of prostate cancer are further illustrated.

1. Experimental Method

A mouse model of spontaneous prostate with overexpression of C-MYC (Hi-Myc) was established. After 4 months, the mice developed mPIN/cancer transition and were randomly divided into a normal control (NC) group (gavaged with a solvent) and an Enza group. The mice in the Enza group were gavaged with 10 mg/Kg of Enza once every three days for a total of 30 days. A part of the mice were sacrificed and their prostate cancers were photographed and weighed. It was found that the Enza can significantly relieve the disease. The prostate weight of the Enza group was reduced by half compared with the NC group. The remaining mice were continuously administered according to the above method for 30 days. It was found that the mice in the Enza group had a relapse. After that (the mice were 6 month old), the mice were randomly divided into an NC group (always gavaged with a solvent), an Enza single group, a Pola single group, and an Enza and Pola combined group. The mice were correspondingly gavaged. The mice were gavaged with 30 mg/Kg of Enza each time in the Enza single group, 30 mg/Kg of Pola each time in the Pola single group and 10 mg/Kg of Enza and 20 mg/Kg of Pola each time in the Enza and Pola combined group once every three days for a total of 30 days. The mice were sacrificed and their prostate cancers were photographed, weighed and subjected to immunohistochemistry.

Figure 6:
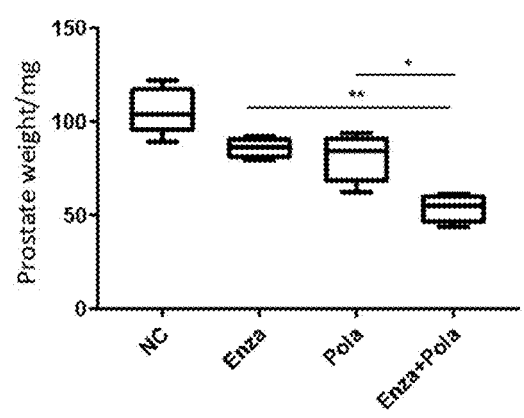
FIG. 6 shows a change of prostate weight of mice in each group with administration in example 5.

FIG. 6 shows a change of prostate weight of mice in each group with administration. The specific results are shown in Tables 4.

TABLE 4

Effect of different administrations (for 30 days) after relapse caused by drug resistance

| Administration | Average prostate weight of mice |
|---|---|
| NC group | 105.4 mg |
| Enza single group after relapse caused by drug resistance (30 mg/Kg) | 85.9 mg |
| Pola single group after relapse caused by drug resistance (30 mg/Kg) | 81.2 mg |
| Enza and Pola combined group after relapse caused by drug resistance (Enza: 10 mg/Kg + Pola: 20 mg/Kg) | 53.8 mg |

What is claimed is:

1. A method of preparing a EPI and enza-resistant and castration-resistant prostate cancer drugs, which comprises:
   providing the castration-resistant prostate cancer drugs enzalutamide and EPI; and
   adding polaprezinc to the castration resistant prostate cancer drugs,
   wherein the castration-resistant prostate cancer drugs and the polaprezinc are present at a mass ratio of (1 to 5):1, respectively.

2. A method of treating EPI and Enza-resistant castration-resistant prostate cancer, which comprises administering an effective amount of the composition prepared by the method of claim 1 to a patient in need thereof,
   wherein the patient has EPI and Enza-resistant castration-resistant prostate cancer.

3. The composition prepared by the method of claim 1.

4. The drug composition according to claim 3, wherein the composition further comprises a pharmaceutical auxiliary material.

5. The composition according to claim 4, wherein the pharmaceutical auxiliary material comprises one or more of a solvent, a propellant, a solubilizer, a cosolvent, an emulsifier, a colorant, a binding agent, a disintegrant, a filler, a lubricant, a wetting agent, an osmotic pressure regulator, a stabilizer, a flow aid, a corrigent, a preservative, a suspending agent, a coating material, an aromatic, an anti-binding agent, a chelating agent, a penetration enhancer, a pH regulator, a buffering agent, a plasticizer, a surfactant, a foaming agent, an antifoaming agent, a thickener, a clathrating agent, a humectant, an absorbent, a diluent, a flocculant, a deflocculant, a filter aid, and a release retardant.

6. The composition according to claim 3, wherein the composition further comprises a carrier.

7. The composition according to claim 6, wherein the carrier comprises one or more of a microcapsule, a microsphere, a nanoparticle, and a liposome.

8. The composition according to claim 3, wherein the composition is in a dosage form of an injection, a lyophilized powder for injection, a controlled release injection, a liposome injection, a suspension, an implant, an embolic agent, a capsule, a tablet, a pill, or an oral liquid.

* * * * *